United States Patent Office 2,698,078
Patented Dec. 28, 1954

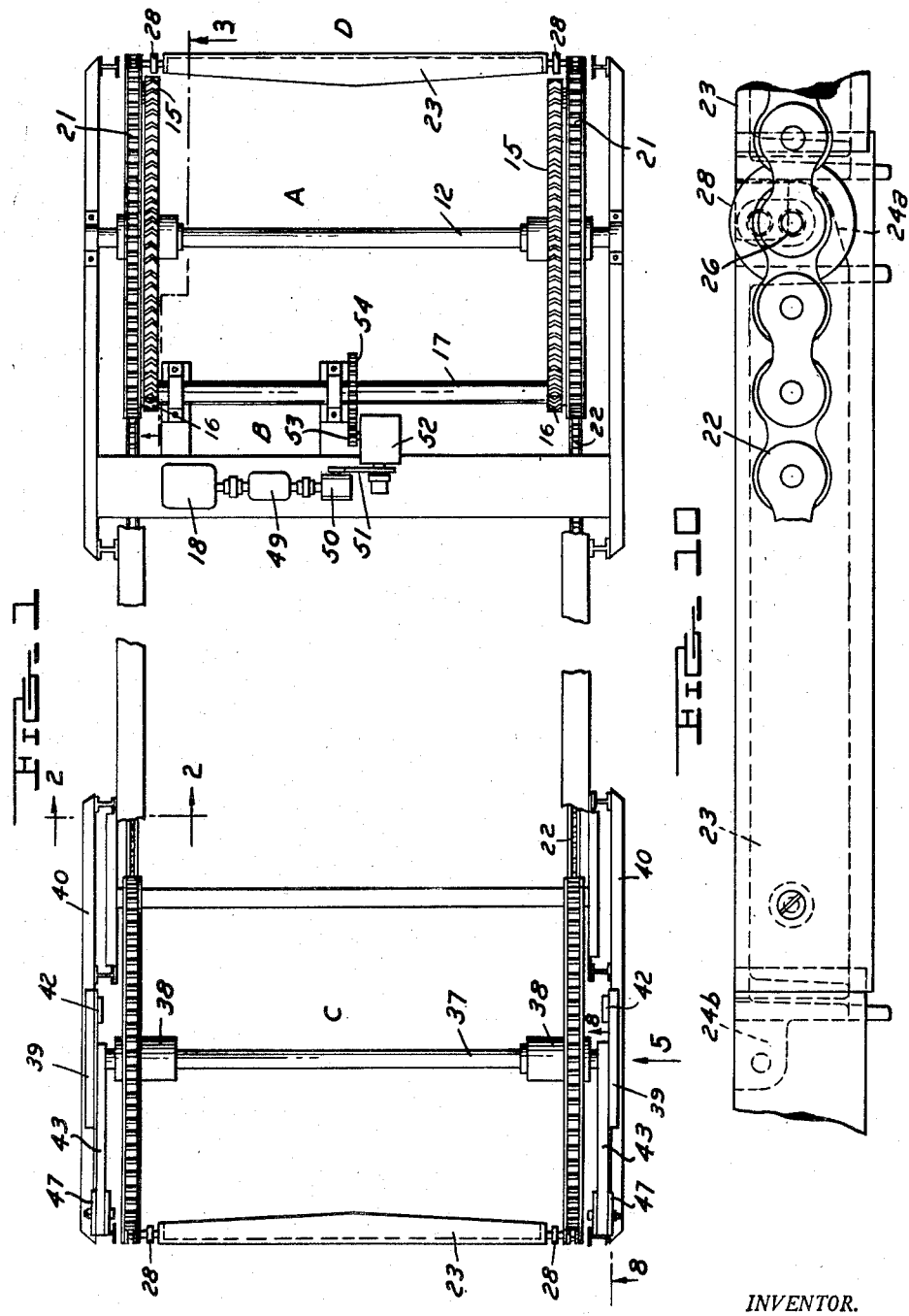

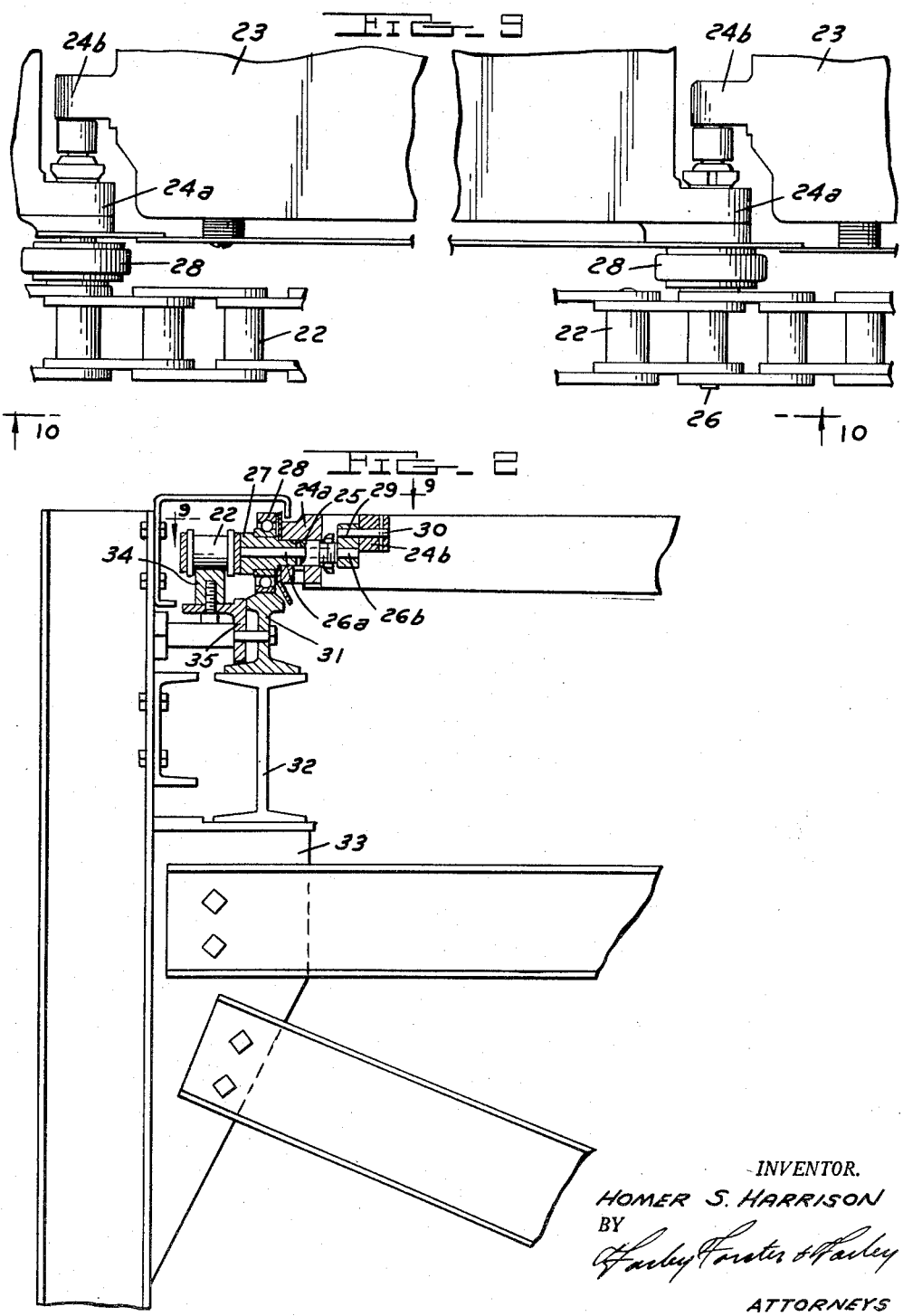

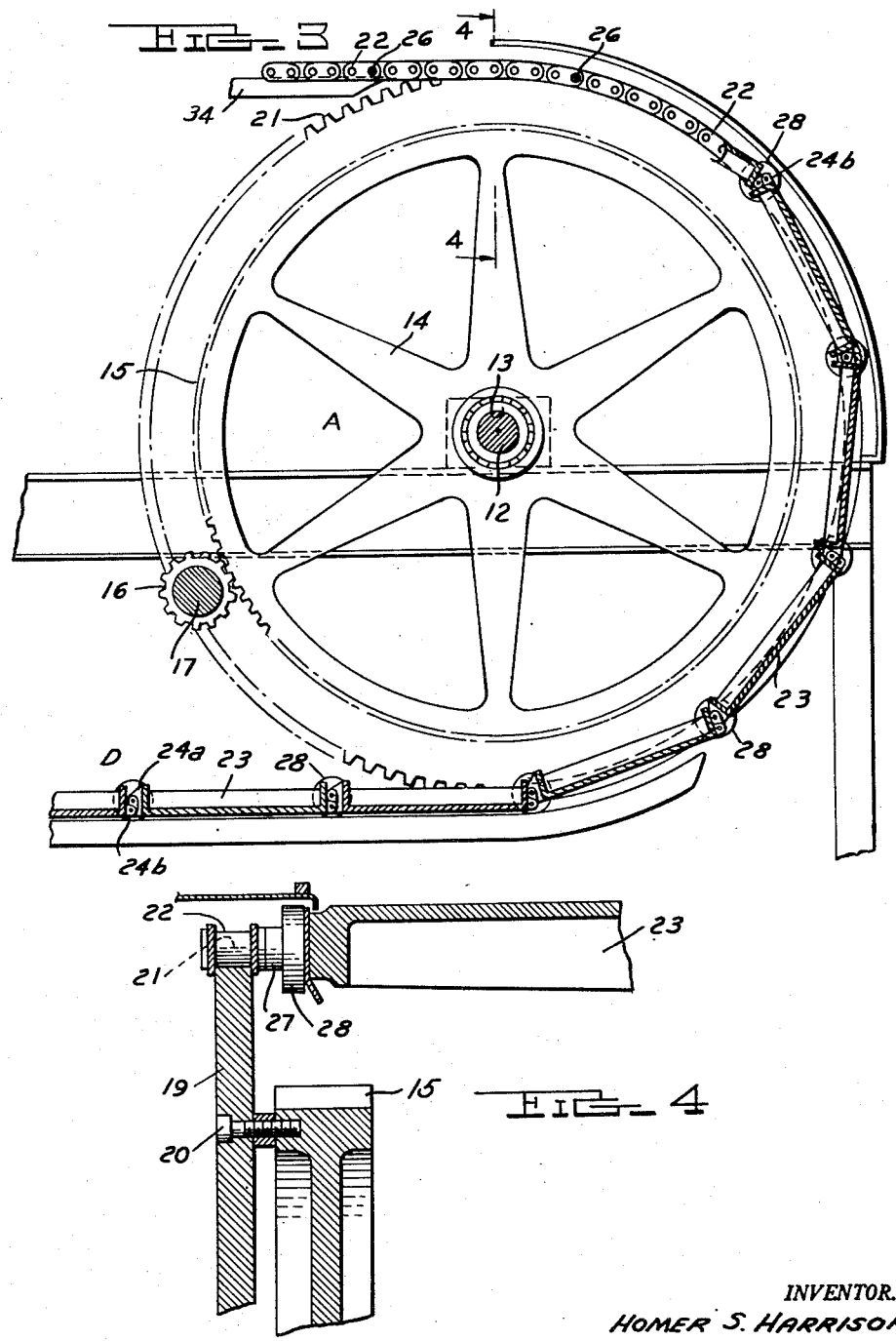

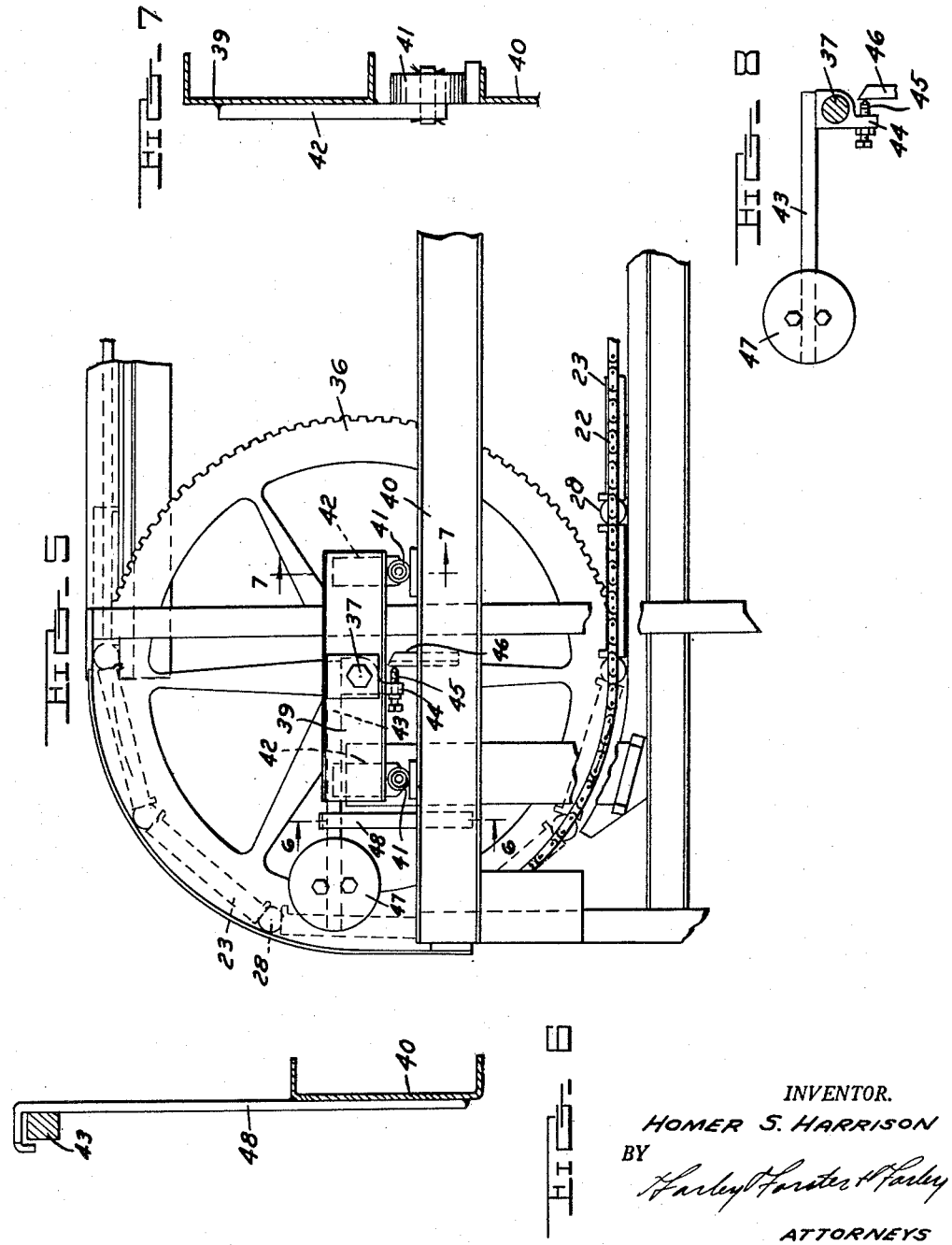

2,698,078

NONPULSATING AND VIBRATIONLESS CONVEYER

Homer S. Harrison, Detroit, Mich., assignor to Allied Steel and Conveyors, Inc., Detroit, Mich., a corporation of Michigan Application October 10, 1950, Serial No. 189,405

2 Claims. (Cl. 198—195)

This invention relates to a conveyor which is particularly directed to meet unusual and critical requirements for smooth, steady, non-pulsating and nonvibrating conveyance of articles.

The particular requirement for which the present invention was developed involves the manufacture of television tubes wherein powdered phosphorescent screen material is deposited on the inner face of the tube in a uniform layer by mixing such material in a liquid suspension within the tube and then permitting the powder to gradually settle from the suspension onto the inner face of the tube. Since any pulsation or vibration of the tube during the settling action will cause a washing of the liquid leaving rings or other irregular deposits of the phosphorescent material, it is necessary to approach a condition of absolute stability of the liquid during the settling time.

While the process was first carried out in stationary stands for the television tubes, numerous considerations pointed to the desirability of carrying out the settling action on a steadily moving endless conveyor. For example, since a satisfactory application of the phosphorescent material involves the necessity of an accurately uniform settling time after which the liquid vehicle must be poured off, the use of an endless conveyor would facilitate the accurate timing of settling action, as well as to provide an automatic means of pouring off the liquid as the television tubes pass around the end of the head sprocket. Furthermore, it would provide straight-line continuous production characteristics desirable for high-volume output.

However, according to available information, all conveyor units tried out prior to the development of the present invention moved with pulsations and vibrations which prevented a satisfactorily uniform deposit of screen material. Such pulsations and vibrations were found to arise largely from uneven frictional resistance to conveyor movement; drive shaft torque deflection resulting from such uneven resistance loads multiplied by a lever arm equal to the radius of the drive sprocket resulting in an appreciable resilient pulsation in the sprocket drive; vibrations transmitted to the conveyor from the drive motor; and chording effects of the drive chain passing over the sprocket.

Accordingly, it is the principal object of the present invention to provide an endless conveyor capable of delivering uniform steady motion free of substantially all usual pulsations and vibrations typical of conventional conveyor drives.

More particularly, it is an object of the present invention to minimize the substantial torque deflection and resulting pulsation incident to conventional conveyor sprocket drive through a central drive shaft at the axis of the sprocket.

Another object is to provide a drive between the rotating motor and conveyor drive sprocket adapted to completely eliminate the transmission of any motor vibration to such sprocket.

Another object is to minimize the pulsating effect attributable to the conveyor chain engagement of individual sprocket teeth, producing an alternate raising and lowering of the center line of the conveyor chain.

Another object is to provide a perimeter drive for the conveyor sprocket, utilizing a central shaft as an axis for rotation of the sprocket with antifriction bearings interposed between the sprockets and stationary bearings.

Another object is to minimize torque deflection through the use of a relatively small pinion having a large drive shaft for driving the conveyor sprockets.

Another object is to minimize pulsations arising from gear tooth engagement through the use of a herringbone form of gear construction.

Another object is to provide a slat or pallet type of conveyor wherein the pitch of the conveyor chain may be made only a fraction of the pitch of the pallets or slats in order to utilize the relatively smooth operating characteristics of a short-pitch conveyor chain passing over a large number of relatively small sprocket teeth as compared to a longer pitched chain passing over fewer and larger sprocket teeth.

Another object is to incorporate means for compensating for the chording effect arising from the fractional length of chain pitch compared to slat pitch in passing around the sprocket which will entirely avoid the introduction of pulsations in the transition from straight line movement to arcuate movement around the sprocket.

Another object is to provide means to overcome vibration or pulsation arising from chain wear increasing the length of the conveyor chain.

Another object is to provide a slat or pallet conveyor with a conveyor chain at either side passing over the conveyor drive sprockets with a construction adapted to equalize the length of drive from a single drive motor to each of the drive sprockets in order to avoid variations in torque deflection which would otherwise arise from an unequalized drive.

Another object is to provide an automatic chain tensioning device for each of the tail sprockets whereby the tension in each of the conveyor chains may be automatically and independently maintained at a predetermined value.

These and other objects will be more readily understood from the following detailed description of a particular embodiment of my invention and from an examination of the drawings disclosing such embodiment wherein:

Fig. 1 is a plan view of a slat conveyor incorporating the features of my invention;

Fig. 2 is a sectional view taken along the line 2—2 of Fig. 1;

Fig. 3 is a sectional view along the line 3—3 of Fig. 1;

Fig. 4 is a sectional view taken along the line 4—4 of Fig. 3;

Fig. 5 is a side elevation of the tail sprocket taken along the line 5—5 of Fig. 1;

Fig. 6 is a sectional view taken along the line 6—6 of Fig. 5;

Fig. 7 is a sectional view taken along the line 7—7 of Fig. 5;

Fig. 8 is a sectional view taken along the line 8—8 of Fig. 1;

Fig. 9 is a fragmentary plan view taken along the line 9—9 of Fig. 2 but omitting stationary track members; and Fig. 10 is a fragmentary side elevation taken along the line 10—10 of Fig. 9.

Referring to Fig. 1, it will be seen that the present embodiment illustrating my invention takes the form of a slat conveyor comprising a pair of head sprockets A, a drive therefor generally indicated as B, a pair of tail sprockets C and an endless slat type conveyor belt D.

As best seen in Figs. 1, 3 and 4, the head sprockets A are not driven through the central shaft 12, which shaft is stationary and serves as a dead axle to mount at either end the inner race of an antifriction bearing 13, the outer race of which carries the hub of one sprocket member 14. Each sprocket is provided near its outer perimeter with an external herringbone gear 15 adapted to be drivingly engaged by a small pinion 16. The pinions for both sprockets are driven by a common oversized drive shaft 17 by a drive motor 18 through reduction gearing, which will presently be described in detail.

On the outside of each of the sprocket gears 15 an annular ring 19 is bolted, as shown at 20, the outer perimeter of which is of a diameter slightly greater than that of the gear 15 and is formed with sprocket teeth 21 for engaging a very short pitch roller type conveyor chain 22 which forms an integral part of the slat conveyor belt D. As best seen in Figs. 3 and 9, the pitch of the roller chain 22 is but a small fractional part of the pitch of the individual load carrying slat members 23, which is the present case are of appropriate proportions for conveying television tubes for purposes mentioned above. (Since the specific method of holding the article to be conveyed forms no part of the present invention, a disclosure of the racks and the television tubes has been omitted from this disclosure.)

It will be seen that each conveyor slat 23 is supported at four points from forwardly and rearwardly projecting lugs 24a and 24b, the former being closely adjacent the conveyor chain 22, while the latter are spaced inwardly somewhat in longitudinally overlapping relationship with the forward lugs of adjacent slats. Each of the forward lugs 24a is provided with a transverse bore 25 which is coaxial with the connecting pin 26 of the adjacent links of the roller chain 22, and an extension 26a of such connecting pin serves to pilot a bearing 27 for an antifriction wheel 28, which bearing also provides a pivotal connection for lug 24a. A further extension 26b of the connecting pin 26 forms a pivotal connection for a vertical link 29, the upper end of which is pivotally connected by pin 30 to the rearward lug 24b of adjacent conveyor slat 23.

The wheels 28 travel along a track 31 mounted on I-beam 32 on frame members 33 and define the horizontal path of the upper side of the slat conveyor, while a further track member 34 mounted on the track member 31 by angle member 35 serves to support the roller chain 22 continuously along a parallel horizontal path throughout the upper reach of the conveyor between the head and tail sprockets, thus avoiding any catenary suspension of the roller chain 22 between supporting points of the wheels 28 which might otherwise lead to a slight amount of play in the effective pitch length of the conveyor slats 23.

It will be seen from the above description that the forward end of each conveyor slat is held in fixed longitudinal relationship with the links of the roller chain 22 joined by connecting pin 26, while the rear end of each conveyor slat is capable through the articulation of vertical link 29 of adjusting its position relative to adjacent links of chain 22 as required in passing around the head and tail sprockets to compensate for the chording effect arising from the much greater pitch length of the slats 23 compared to the pitch of the roller chain 22. Such arrangement permits rear lugs 24b of each conveyor slat to move backwardly relative to the forward lugs 24a of adjacent conveyor slats to provide a somewhat shorter effective pitch length for the slats in traveling around the sprocket than prevails during their horizontal travel, thereby compensating for the difference in length between the chord line formed by each conveyor slat and the more arcuate line assumed by the corresponding links of the roller chain 22.

Referring to Figs. 1 and 5 to 8, it will be seen that tail sprockets 36 rotate on stationary shaft 37 with antifriction bearings 38 interposed therebetween in a manner similar to the head sprockets 14. An extension of the stationary shaft C laterally beyond each of the tail sprockets 36 is secured to a longitudinally shiftable channel member 39 supported on the stationary frame member 40 through a pair of longitudinally spaced roller wheels 41 connected to the member 39 by wheel brackets 42. A lever arm 43, best shown in Fig. 8, is pivotally connected to the shaft 37 intermediate each sprocket 36 and its carrying member 39, one end of the lever being provided with a vertically depending lug 44 adapted through adjustment screw 45 to bear against a stationary reaction member 46 rigidly connected to the frame 40, while the other horizontal member of the lever 43 is provided at its end with a weight 47 tending to rotate the lever 43 in a counterclockwise direction, as seen in Fig. 8, thereby exerting a constant, uniform longitudinal tensioning load on each of the roller chains 22 via the shaft 37 and sprocket 36. It will be seen that under this arrangement each of the lever arms 43 operates independently of the other to maintain a uniform tensioning load and to provide an automatic takeup for wear in such roller chain, the adjustment screw 45 serving as a means to maintain the horizontal arm of the lever 43 in its horizontal position. A strap 48 secured to the frame member 40 serves to limit the upward movement of the horizontal arm of lever 43 to prevent any major dislocation of the tail sprocket assembly C in the event of any accidental excessive load which might otherwise tend to throw the weighted lever 43 up beyond its effective position.

Referring now to the conveyor drive B shown in Fig. 1, it will be seen that the motor 18 is positioned to run on a horizontal transverse axis transmitting its drive to shaft 17 through an aligned reduction gear 49, a right-angle reduction gear 50, a transversely extended flexible belt 51, a second right-angle reduction gear 52, a pinion 53 and spur gear 54 positioned midway on shaft 17. The latter shaft is substantially heavier than required to drive the small herringbone pinions 16 in order to minimize load deflection in such shaft, and it will be seen that by employing a perimeter drive for the sprocket members 14 the deflection in any given drive shaft is reduced to a small fraction of that which would be encountered with a conventional center shaft drive for such sprockets, the valve of such fraction being equal to the ratio of diameters of the pinions 16 and sprocket gear 15.

Since any vibrations of the drive motor 18 will lie in an orbital path having a vertical longitudinal plane of movement, they will be completely lost in the flexible belt 51 running in a plane perpendicular to that of the orbital vibration even though they may be transmitted in part through reduction gears 49 and 50. While the flexible belt 51 might be capable of transmitting vibrations in a plane parallel to its path of travel, it is apparent that its flexibility in a plane vertical to its path of travel is such as to render it completely incapable of passing any effective motor vibration in the present case which might otherwise eventually reach the conveyor belt via the solid shaft and gear tooth contacts.

Thus it will be seen that applicant has departed from conventional conveyor practice in a number of ways in order to effectively prevent, isolate, damp out or minimize the numerous factors tending to cause a conveyor to run with appreciable pulsation and vibration, the foremost of which are the use of a perimeter drive in place of the conventional center shaft drive for the head sprockets minimizing load deflection in the drive shaft and the accompanying pulsation arising from fluctuation in friction resistance forming part of the load; the use of drive chain with exceptionally small pitch compared to the members required for supporting load in order to minimize any oscillating effects arising from engagement of the sprocket teeth with the drive chain; the provision of a chording compensating means which provides an automatic adjustment required to compensate for the different chord lengths of slat and drive chain links in traveling around head and tail sprockets, while maintaining the slats rigidly supported against any play or vibration imparting movement; the use of independent automatic chain tensioning means for the tail sprockets, together with independent antifriction bearings for such sprockets whereby irregularities in load arising from commercial differences in chain length or nonuniform rates of wear may be avoided; and the use of a flexible drive belt interposed between the drive motor and sprockets in a plane perpendicular to the vibrating plane of the motor to completely isolate such motor vibration from the sprocket.

These various features have enabled me to provide a conveyor which has satisfactorily met seemingly impossible commercial bid specifications calling for no greater degree of pulsation or vibration to be imparted to a load moving on a running conveyor than would be imparted to such load stationarily supported on the floor of the plant in which the conveyor was to be installed.

While a particular embodiment of my invention conforming to a specific commercial application has been disclosed herein in detail, it will be understood that numerous modifications and changes in form might be resorted to without departing from the scope of my invention as set forth in the following claims.

I claim:

1. A nonpulsating endless chain slat conveyor comprising a pair of laterally spaced drive sprockets, a pair of laterally spaced drive chains, rigid load members extending between said drive chains, said chains having a pitch equal to a fractional value of the pitch of said load members, connections between each of said drive chains and longitudinally spaced points on each of said load members, and means incorporated in said connections for accommodating a variation in the effective pitch length of said load members to compensate for the chording effect encountered in passing around the chain sprockets.

2. A nonpulsating endless chain conveyor comprising a pair of laterally spaced drive sprockets, a pair of laterally spaced drive chains and rigid load members extending between said drive chains, said chains having a pitch equal to a fractional value of the pitch of said load members, longitudinally spaced pivotal connections between each of said drive chains and one side of each of said load members, said connections including at one end a vertical connecting link intermediate said chain and load member accommodating a variation in the effective pitch length of said load members to compensate for the chording effect encountered in passing around the chain sprockets.

References Cited in the file of this patent

UNITED STATES PATENTS

| Number | Name | Date |
|---|---|---|
| 471,743 | Dick | Mar. 29, 1892 |
| 534,098 | Dodge | Feb. 12, 1895 |
| 723,504 | Titus | Mar. 24, 1903 |
| 781,614 | McCabe | Jan. 31, 1905 |
| 1,285,448 | Spooner | Nov. 19, 1918 |
| 1,307,202 | Kenney | June 17, 1919 |
| 2,202,882 | Wylie | June 4, 1940 |
| 2,259,366 | Dunlop | Oct. 14, 1941 |
| 2,525,516 | Bergmann et al. | Oct. 10, 1950 |